US008889263B2

(12) United States Patent
Rice

(10) Patent No.: US 8,889,263 B2
(45) Date of Patent: Nov. 18, 2014

(54) COMPOSITE STRUCTURE

(75) Inventor: Edward Claude Rice, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 172 days.

(21) Appl. No.: 13/337,084

(22) Filed: Dec. 24, 2011

(65) Prior Publication Data
US 2012/0263970 A1    Oct. 18, 2012

Related U.S. Application Data

(60) Provisional application No. 61/428,748, filed on Dec. 30, 2010.

(51) Int. Cl.
*B32B 1/08* (2006.01)
*B32B 3/06* (2006.01)
*B32B 15/14* (2006.01)
*F16L 13/007* (2006.01)
*B32B 15/01* (2006.01)

(52) U.S. Cl.
CPC ......... *F16L 13/007* (2013.01); *F05D 2300/603* (2013.01); *B32B 15/01* (2013.01)
USPC ........ 428/608; 428/614; 428/34.1; 415/215.1

(58) Field of Classification Search
None
See application file for complete search history.

(56) References Cited

U.S. PATENT DOCUMENTS

| | | | |
|---|---|---|---|
| 2,888,277 A * | 5/1959 | Melsom | 285/222.4 |
| 2,965,395 A * | 12/1960 | Schmohl et al. | 285/40 |
| 3,655,223 A | 4/1972 | Johnson | |
| 3,989,984 A * | 11/1976 | Amason et al. | 361/212 |
| 4,063,847 A | 12/1977 | Simmons | |
| 4,205,927 A | 6/1980 | Simmons | |
| 4,248,649 A | 2/1981 | Harrison et al. | |
| 4,548,428 A * | 10/1985 | Ruhle | 285/90 |
| 4,773,678 A * | 9/1988 | Canaud et al. | 285/39 |
| 5,028,081 A * | 7/1991 | Fournier | 285/334.4 |
| 5,054,281 A | 10/1991 | Mutch | |
| 5,082,314 A * | 1/1992 | Aubry et al. | 285/148.13 |
| 5,358,262 A | 10/1994 | Roberts | |
| 6,598,906 B2 * | 7/2003 | Brugmann | 285/256 |
| 6,830,437 B2 | 12/2004 | Cairo et al. | |

(Continued)

FOREIGN PATENT DOCUMENTS

| | | | |
|---|---|---|---|
| GB | 1245265 | * | 9/1981 |
| GB | 2112689 | * | 7/1983 |
| GB | 2125732 | * | 3/1984 |

OTHER PUBLICATIONS

Abstract for CN 101382212. Mar. 2009.*

(Continued)

*Primary Examiner* — John J Zimmerman
(74) *Attorney, Agent, or Firm* — Krieg DeVault LLP

(57) ABSTRACT

The present invention provides an apparatus including a first metal component and a second metal component. The apparatus includes an interface between the first component and the second component, and a metal mesh interposed in the first interface. The apparatus further includes a composite component including a composite material. The composite component includes two portions, the first portion filling voids in the first interface and the second portion forming a structure that adjoins the first component and the second component. The metal mesh extends into the second portion of the composite component.

18 Claims, 8 Drawing Sheets

(56) References Cited

U.S. PATENT DOCUMENTS

| | | |
|---|---|---|
| 6,895,757 B2 | 5/2005 | Mitchell et al. |
| 6,904,757 B2 | 6/2005 | Mitchell et al. |
| 7,069,954 B2 * | 7/2006 | Takagi et al. ................. 138/121 |
| 2006/0201135 A1 | 9/2006 | Xie et al. |
| 2007/0036644 A1 | 2/2007 | Harper |

OTHER PUBLICATIONS

Abstract for CN 201368277. Dec. 2009.*
Abstract for CN 201944464. Feb. 2011.*

* cited by examiner

US 8,889,263 B2

COMPOSITE STRUCTURE

CROSS REFERENCE TO RELATED APPLICATIONS

The present application claims benefit of U.S. Provisional Patent Application No. 61/428,748, filed Dec. 30, 2010, entitled COMPOSITE STRUCTURE, which is incorporated herein by reference.

FIELD OF THE INVENTION

The present invention relates generally to structures having composite and metal components, and more particularly relates to joining metal and composite components.

BACKGROUND

Composite materials have desirable material properties such as relatively low material weight that are useful in certain circumstances. Many metallic materials have desirable material properties, such as strength, ductility, and high temperature resistance that are useful in certain circumstances. Engineers appreciate that the joining of metal and composite materials often presents many design challenges. A strong joining interface between the metallic and composite materials would allow a structure to utilize the desired properties of both materials. Accordingly, there is a demand for further contributions in this area of technology.

SUMMARY

One embodiment is a unique apparatus joining a composite component with two metal components. Other embodiments include unique methods and apparatus to join composite and metallic components. Further embodiments, forms, objects, features, advantages, aspects, and benefits shall become apparent from the following descriptions and drawings.

DETAILED DESCRIPTION

Figure 1:
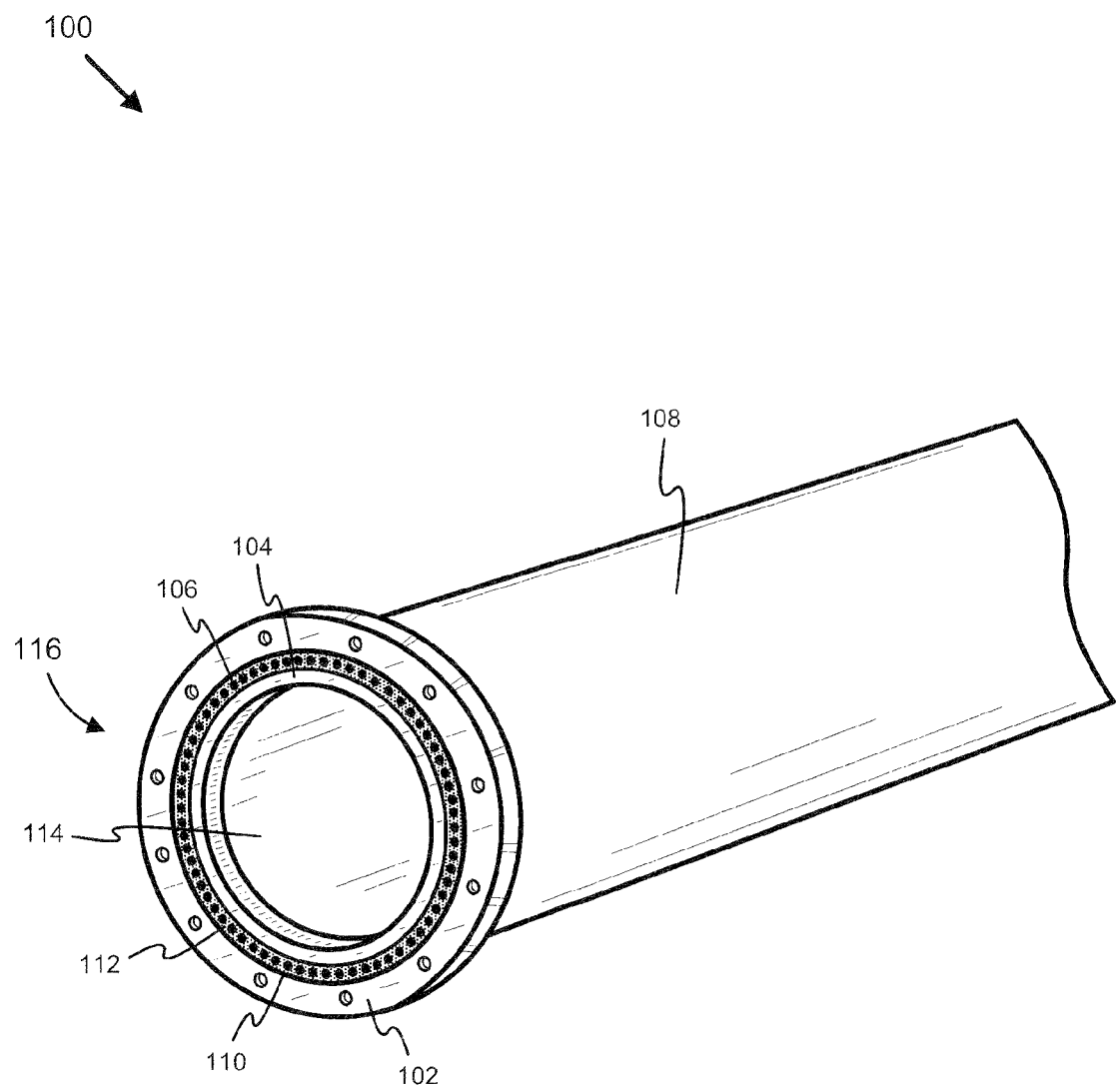
FIG. 1 illustrates some aspects of a non-limiting example of an apparatus having joined composite and metal components in accordance with an embodiment of the present invention.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates some aspects of a non-limiting example of an apparatus 100 having joined composite and metal components in accordance with an embodiment of the present invention. In one form, the apparatus 100 is configured as an engine case for a gas turbine engine, e.g., a compressor case. In other embodiments, the apparatus 100 may take other forms. The apparatus 100 includes a first and second metal component, where the first component is an outer flange ring 102 and the second component is an inner flange ring 104. The outer flange ring 102 and inner flange ring 104 are metallic components that form a first interface 106 where they meet. In one form, the first interface 106 is a circumferential interface such as that illustrated in FIG. 1. In other embodiments, the first interface 106 may take any geometrical form depending upon the shape of the metallic components and how the metallic components are assembled together.

The apparatus 100 includes a composite component 108. Composite component 108 is formed of a composite material. In one form, the composite material is a non-metallic material, for example a carbon fiber composite. However, the composite material may be any composite material known in the art, including, without limitation, ceramics, metallics, matrix composites (e.g., ceramic matrix composites, metal matrix composites and/or organic matrix composites), intermetallics, fibers, and/or resins.

The apparatus 100 further includes a metal mesh 110 interposed in the first interface 106. The metal mesh 110 may be any metallic mesh-like structure understood in the art. Without limitation, examples of a metal mesh 110 material include hardwire tape, hardwire fabric, a metallic mat, a plurality of metal wires, and a metal screen. The selection of metal mesh 110 material depends upon desired physical characteristics, for example and without limitation, tensile strength, heat resistance, corrosion resistance, and compatibility with other materials contacting the metal mesh 110.

In certain embodiments one form, the composite component 108 includes a first portion 112 and a second portion 114. In one form, first portion 112 form an extension of second portion 114. First portion 112 extends into the first interface 106 and fills voids in the first interface 106 and in the metal mesh 110. Second portion 114 forms a structure that adjoins the component 102 and the component 104. In one form, the composite component 108 abuts an outer metallic component (the outer flange ring 102) and an inner metallic component (the inner flange ring 104) axially, e.g., forming a butt joint with the outer metallic component and the inner metallic component. In various embodiments, the composite component 108 may be configured to abut the outer metallic component and the inner metallic component at the same axial location or at different axial locations, e.g., depending upon the axial location of the end faces of the outer metallic component and the inner metallic component. In other embodiments, the composite component 108, and the outer and inner metallic components may be configured to adjoin the component 102 and the component 104 in a different geometric form. For example, the joint between composite component 108 and the outer and inner metallic components, e.g., may be tapered, joining together along conical or other surfaces along the length of the composite component 108 and the outer and inner metallic components. In one form, the composite component 108 is flush with the outer metallic component and/or the inner metallic component. For example, the outer surface of the composite component 108 tube may be flush with the outer surface of the outer flange ring 102, and the inner surface of the composite component 108 tube may be flush with the inner surface of the inner flange ring 104. In other embodiments, the joints between the composite component 108 and the outer and inner metallic components may not be flush.

The metal mesh 110 extends into the second portion 114 of the composite component 108, e.g., extends axially into the composite component 108. In one form, the metal mesh 110 extends into the second portion 114 of the composite component 108 at approximately a circumferential center of the composite component 108. For example, as illustrated in FIG. 1, the composite component 108 includes a tube abutting the outer flange ring 102 and the inner flange ring 104, and the metal mesh 110 extends into the tube at approximately the center of the tube wall, or the circumferential center of the composite component 108. In other embodiments, the metal mesh 110 extends into the composite component 108 away from the circumferential center, for example near the inner wall or outer wall of the tube.

In certain embodiments, the outer metallic component (the outer flange ring 102) and the inner metallic component (the inner flange ring 104) form a connection interface 116. For example, the outer metallic component and inner metallic component may form a flange interface or a boss interface (see, for example, FIG. 3 and related description) wherein an object (not shown) connects to the apparatus 100. In certain embodiments, connecting force is transferred from the connection interface 116 to the composite component 108. For example, the connection interface 116 illustrated in FIG. 1 is a flange interface. A device connecting to the connection interface 116 may apply a connecting force that may tend, under certain loading conditions, toward pulling the flange away from the composite component 108. However, the metal mesh 110 and the first portion 112 of the composite component transfer the connecting force into the composite component 108, which prevents separation of the flange from the composite component 108.

Figure 2:
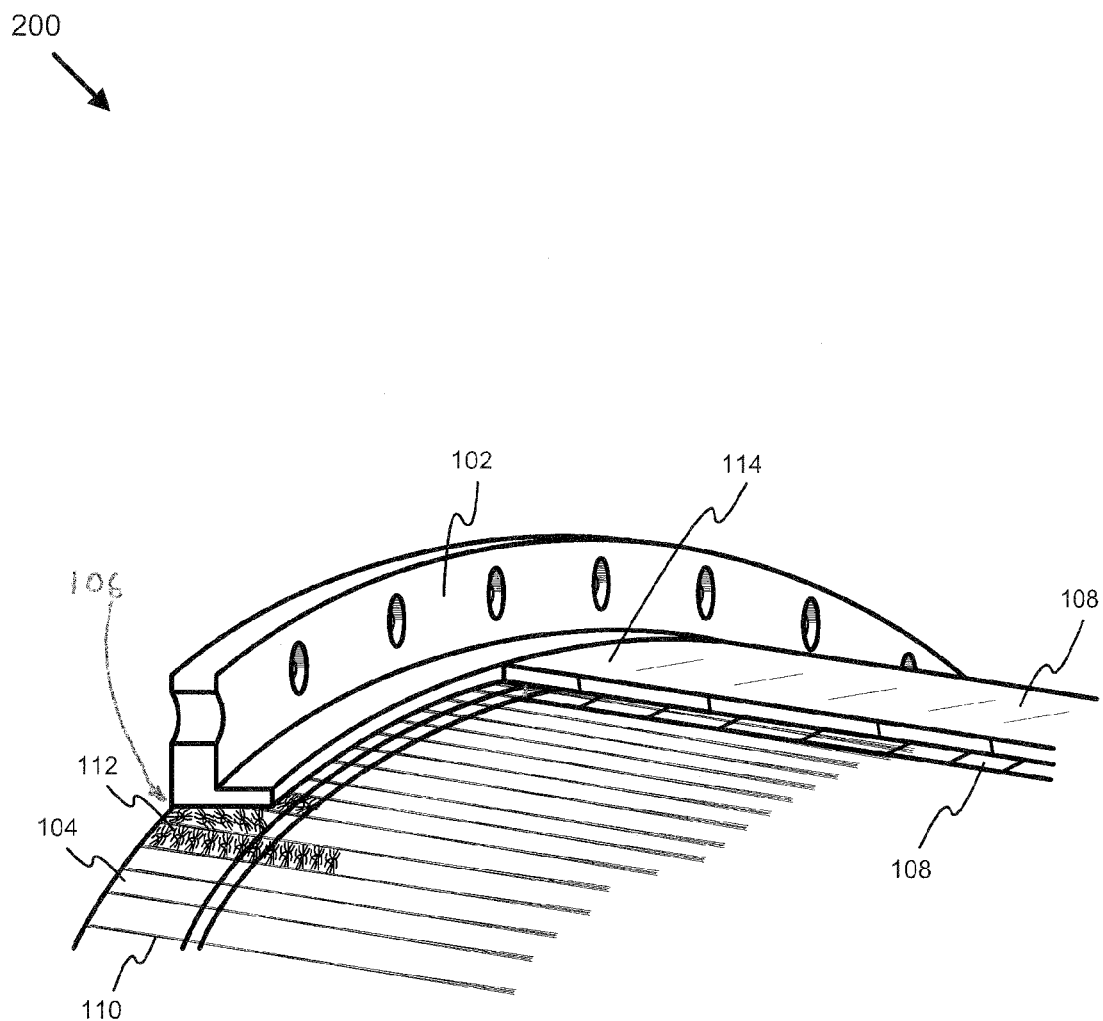
FIG. 2 is a cutaway view of illustrating some aspects of an apparatus having joined composite and metal components in accordance with an embodiment of the present invention.

FIG. 2 is a cutaway view of an apparatus 200 having joined composite and metal components. Apparatus 200 is similar in some respects to the apparatus 100. The apparatus 200 includes the outer flange ring 102, the inner flange ring 104, and the composite component 108. The composite component 108 includes the first portion 112 extending into the circumferential interface 106 between the outer flange ring 102 and the inner flange ring 104. The composite component 108 includes the second portion 114 forming a structure abutting the outer flange ring 102 and the inner flange ring 104. The apparatus 200 further includes a metal mesh 110 with a portion disposed in the circumferential interface 106 and a portion extending into the second portion 114 of the composite component 108.

Figure 3:
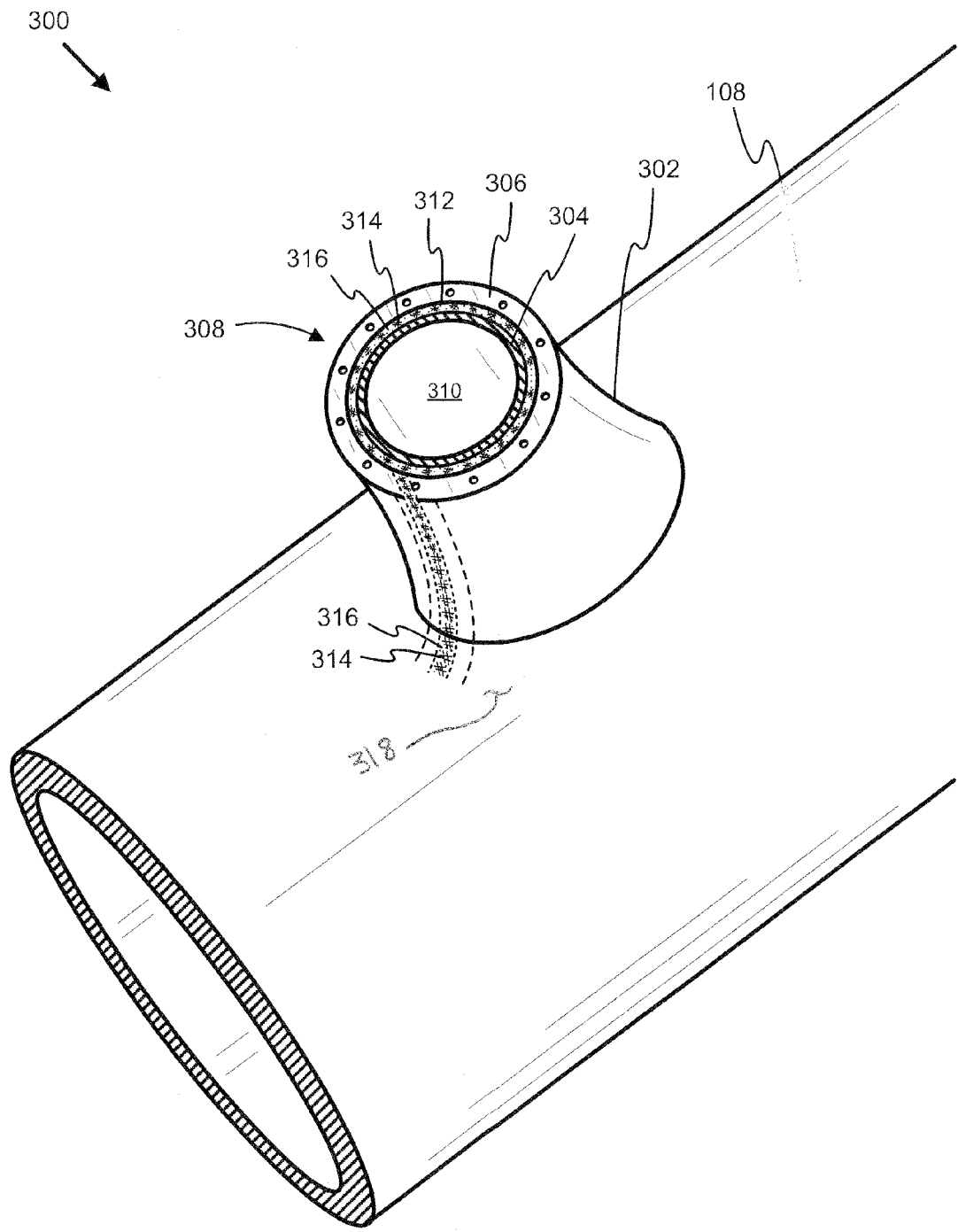
FIG. 3 depicts some aspects of a non-limiting example of an apparatus having a metal boss joined to a composite component in accordance with an embodiment of the present invention.

FIG. 3 illustrates some aspects of a non-limiting example of an apparatus 300 including a metal boss 302 joined to a composite component in accordance with an embodiment of the present invention. The apparatus 300 includes a metallic boss inner portion 304 and a metallic boss outer portion 306. The apparatus 300 includes a connection interface, which, for example and without limitation, may be a face surface 308 and/or an inner surface 310 of the boss 302. For example, in some embodiments, face surface 308 may include openings for threaded fasteners, or the inner surface 310 of the boss 302 may be threaded in certain embodiments, forming a connection interface. In certain embodiments, the metallic boss inner portion 304 and the metallic boss outer portion 306 have a circumferential interface 312; and a metal mesh 314 and a first portion 316 of the composite component 108 may be disposed in the circumferential interface 312, e.g., akin to the first portion 112 extending into the circumferential interface 106 in the embodiment of FIG. 2. The composite component includes a second portion 318, e.g., akin to the second portion 114 in the embodiment of FIG. 2. The metal mesh 314 extends into the second portion 318—for example within the wall of the tube of the second portion 318 of the composite component 108.

Figure 4:
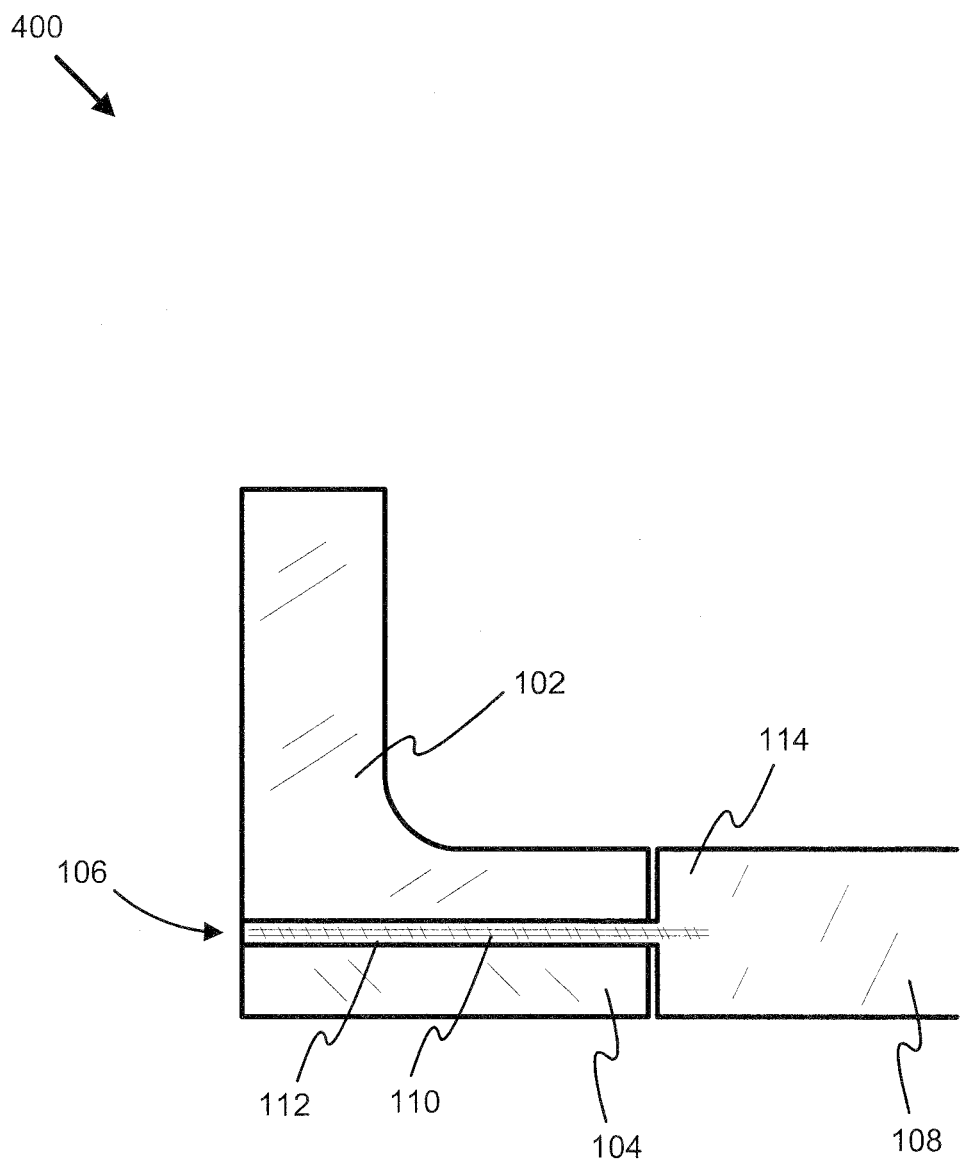
FIG. 4 is a schematic diagram illustrating some aspects of a non-limiting example of an apparatus having joined composite and metal components in accordance with an embodiment of the present invention.

FIG. 4 is a schematic diagram illustrating some aspects of a non-limiting example of an apparatus 400 having joined composite and metal components in accordance with an embodiment of the present invention. Apparatus 400 is similar in some respects to the apparatus 100 and the apparatus 200 of FIGS. 1 and 2. In the illustration of FIG. 4, the composite component has a second portion 114 forming a structure that abuts a metal component 102 and a metal component 104. The apparatus 400 includes a metal mesh 110 that has a portion disposed within an interface 106 between the metal component 102 and the metal component 104. The metal mesh 110 extends into the second portion 114 of the composite component.

In certain embodiments, the composite component 108 is circumferentially flush with the metal component 102 and/or the metallic component 104. For example, the outer wall 402 of the composite component 108 tube may be flush with the outer surface 404 of the metal component 102, and the inner wall 406 of the composite component 108 tube may be flush with the inner surface 408 of the metal component 104. In other embodiments, the joints between the composite component 108 and the outer and inner metallic components may not be flush.

Figure 5:
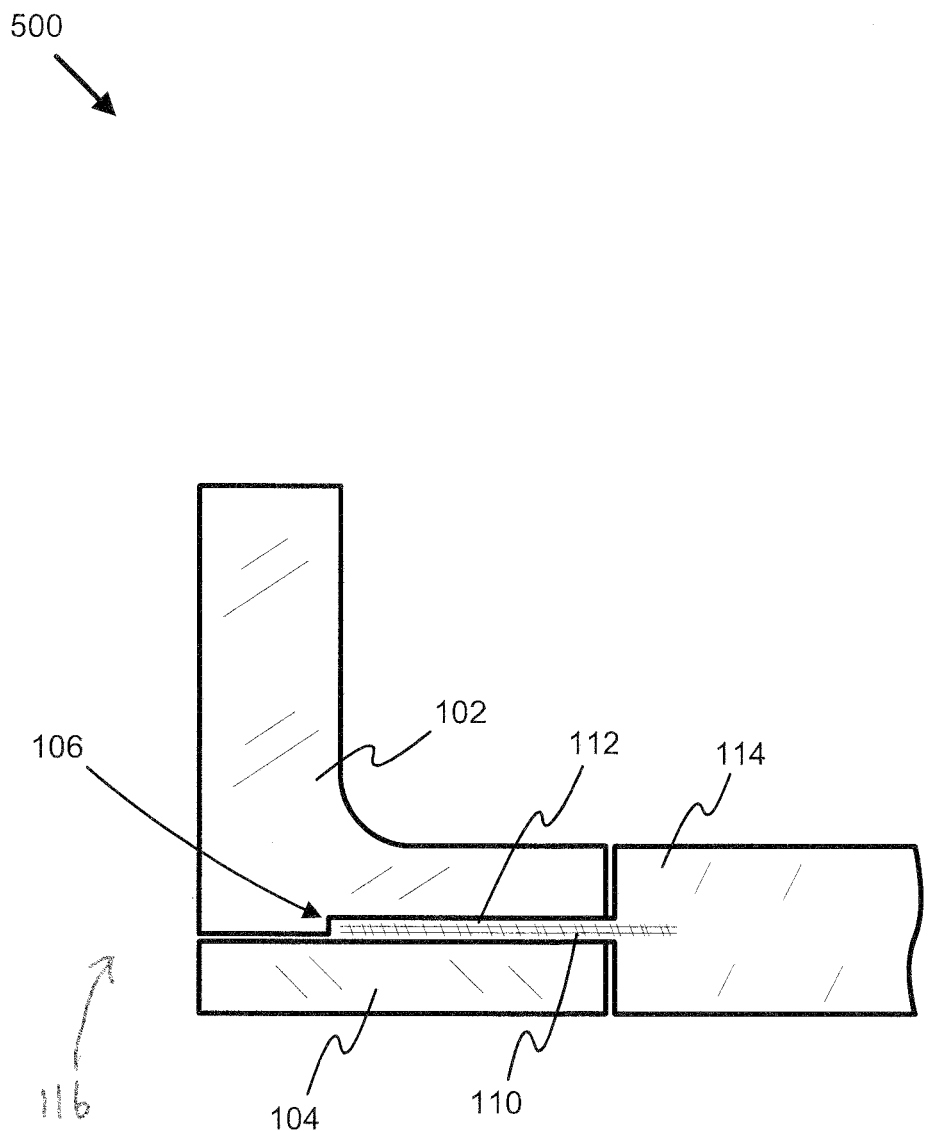
FIG. 5 is a schematic diagram illustrating some aspects of a non-limiting example of an apparatus having joined composite and metal components in accordance with an embodiment of the present invention.

FIG. 5 is a schematic diagram illustrating some aspects of a non-limiting example of an apparatus 500 having joined composite and metal components in accordance with an embodiment of the present invention. Apparatus 500 is similar in some respects to the apparatus 100 and the apparatus 200 of FIGS. 1 and 2. In the illustration of FIG. 5, a metal mesh 110 has a portion disposed within an interface 106 of a metal component 102 and a metal component 104. The metal mesh 110 in FIG. 5 does not extend all the way through the interface 106 to the faces of metal components 102 and 104, and is therefore not exposed to a connection interface 116.

Figure 6:
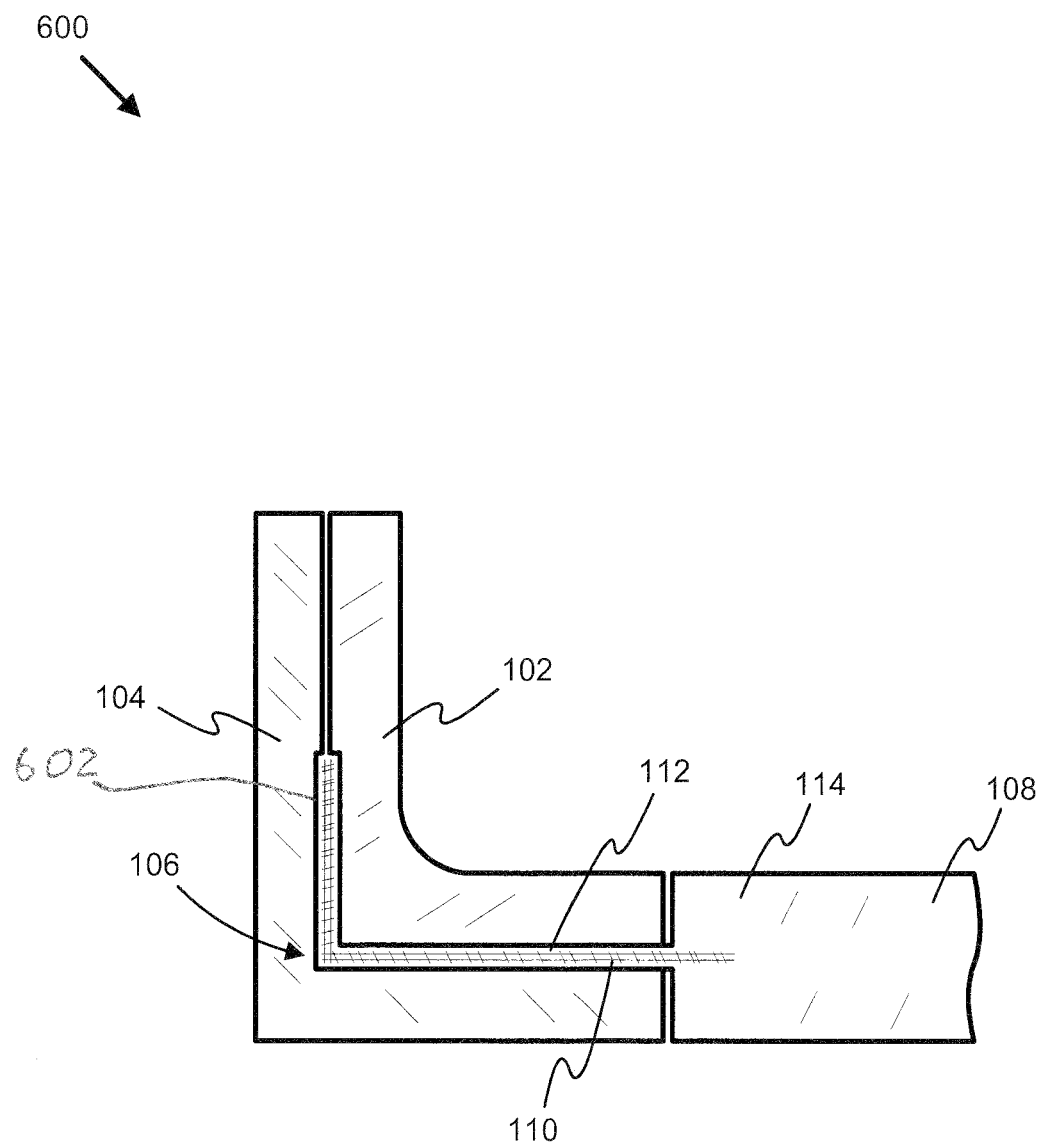
FIG. 6 is a schematic diagram illustrating some aspects of a non-limiting example of an apparatus having joined composite and metal components in accordance with an embodiment of the present invention.

FIG. 6 is a schematic diagram illustrating some aspects of a non-limiting example of an apparatus 600 including having composite and metal components in accordance with an embodiment of the present invention. Apparatus 600 is similar in some respects to the apparatus 100 and the apparatus 200 of FIGS. 1 and 2. In the illustration of FIG. 6, a first interface 106 includes a rolled lip 602. Rolled lip 602 is an extension of first interface 106 that extends in a different direction from the balance of the first interface 106, e.g., radially outward in the illustration of FIG. 6. In certain embodiments, a metal mesh 110 extends from the composite component 108 into the rolled lip 602.

Figure 7:
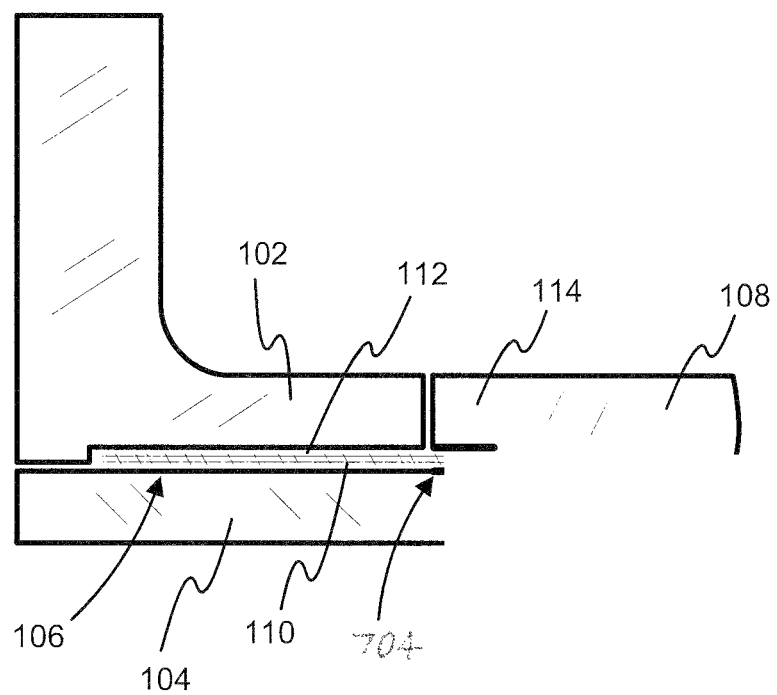
FIG. 7 is a schematic diagram illustrating some aspects of a non-limiting example of an apparatus having joined composite and metal components in accordance with an embodiment of the present invention.

FIG. 7 is a schematic diagram illustrating some aspects of a non-limiting example of an apparatus 700 having joined composite and metal components in accordance with an embodiment of the present invention. Apparatus 700 is similar in some respects to the apparatus 100 and the apparatus 200 of FIGS. 1 and 2. In the illustration of FIG. 7, the metal mesh 110 extends into the first interface 106. In certain embodiments, the apparatus 700 further includes a second interface 704 between the metal component 104 and the composite component 108, and the metal mesh 110 is interposed in the second interface 704. In certain embodiments, the second interface 704 is included along an axial segment of the composite component 108.

Figure 8:
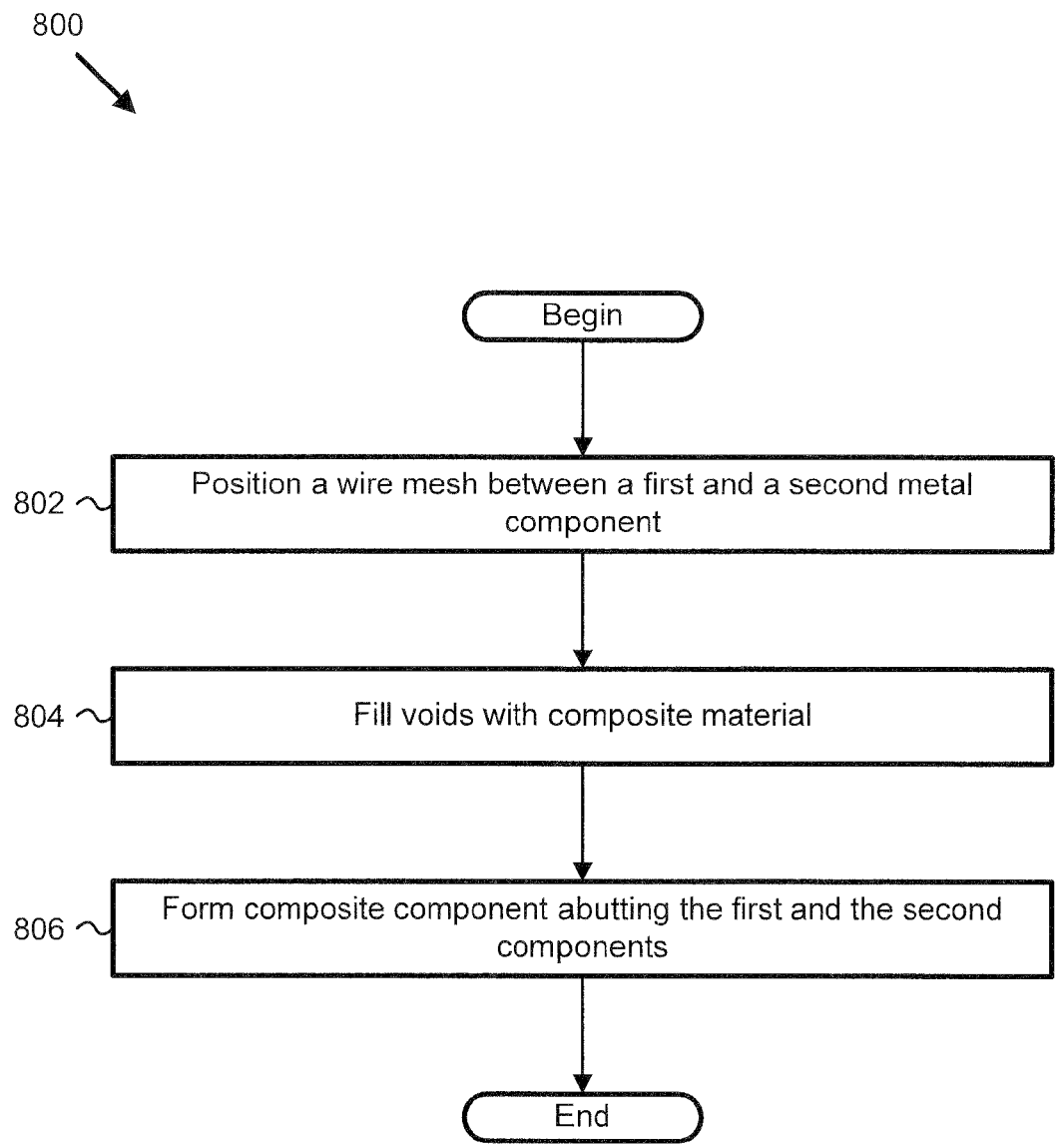
FIG. 8 is a schematic flow diagram illustrating some aspects of a non-limiting example of a procedure for joining composite and metal components.

FIG. 8 is a schematic flow diagram illustrating a procedure 800 for joining composite and metal components. The procedure 800 includes an operation 802 to position a wire mesh 110 between a metallic component 102 and a metallic component 104. The procedure 800 further includes an operation 804 to position a composite material such that the composite material fills voids in the interface 106 and the wire mesh 110. The procedure includes an operation 806 to form the composite material around the wire mesh 110 and into a composite component 108 adjoining, e.g., abutting, the metallic component 102 and the metallic component 104.

Certain operations of FIG. 8 may be omitted, certain operations not shown in FIG. 8 may be added, and operations may be performed in a different order or performed in an alternate manner. Any adjustments or additions to operations may be in whole or part.

As is evident from the figures and text presented above, a variety of embodiments according to the present invention are contemplated.

In certain embodiments, an apparatus includes a first component comprising a metal and a second component comprising a metal. The apparatus further includes a first interface between the first component and the second component, wherein a metal mesh is interposed in the first interface. In certain further embodiments, the apparatus further includes a composite component comprising a composite material, the composite component having a first portion filling voids in the first interface and in the metal mesh, and a second portion forming a structure that adjoins the first component and the second component, and the metal mesh extends into the second portion of the composite component. In certain further embodiments, the first component includes an inner metallic flange ring and the second component includes an outer metallic flange ring. In certain alternate embodiments, the first component includes a metallic boss inner portion and the second component includes a metallic boss outer portion. In certain embodiments, the first interface includes a rolled lip.

In certain embodiments, the apparatus includes a second interface between the first component and the composite component, and the metal mesh is interposed in the second interface. In certain further embodiments, the second interface includes an axial segment of the composite component. In certain embodiments, the apparatus includes a second interface between the second component and the composite component, and the metal mesh is interposed in the second interface. In certain further embodiments, the second interface includes an axial segment of the composite component.

In certain embodiments, the metal mesh is a hardwire tape, a hardwire fabric, a metallic mat, a plurality of metal wires, and/or a metal screen. The composite material may be a non-metallic composite material. In certain embodiments, the metal mesh extends into the second portion of the composite component at approximately a circumferential center of the composite component.

In certain embodiments, an apparatus includes an outer metallic component and an inner metallic component having a circumferential interface, and a composite component that axially adjoins the outer metallic component and the inner metallic component. The apparatus further includes a metal mesh disposed in the circumferential interface and extending axially into the composite component. In certain further embodiments, the outer metallic component and the inner metallic component form a flange. In certain embodiments, the composite component includes a non-metallic composite. In certain embodiments, the composite component extends into the circumferential interface and fills voids in the circumferential interface. In certain embodiments, the composite component is circumferentially flush with the outer metallic component and the inner metallic component.

In certain embodiments, an apparatus includes an outer metallic component and an inner metallic component having a circumferential interface, a composite component that adjoins the outer metallic component and the inner metallic component, where the outer metallic component and the inner metallic component form a connection interface, and means for transferring a connecting force from the connection interface to the composite component. In certain further embodiments, the connection interface comprises one of a flange interface and a boss interface. In certain embodiments, the means for transferring the connecting force includes a wire mesh sandwiched between the outer metallic component and the inner metallic component, wherein the wire mesh extends into the composite component. In certain further embodiments, the circumferential interface includes a rolled lip, and the wire mesh sandwiched between the outer metallic component and the inner metallic component extends into the rolled lip.

In certain embodiments, a method includes positioning a wire mesh between a first metallic component and a second metallic component, positioning a composite material such that the composite material fills voids in the wire mesh and such that the composite material further forms a composite component adjoining the first metallic component and the second metallic component. In certain further embodiments, positioning the wire mesh further includes positioning a portion of the wire mesh within the composite component. In certain further embodiments, the first metallic component and the second metallic component form a circumferential interface, and positioning the wire mesh includes disposing a portion of the wire mesh in the circumferential interface. In certain further embodiments, the first metallic component includes an outer flange ring and the second metallic component comprises an inner flange ring. In certain further embodiments, the first metallic component includes an outer boss portion and the second metallic component includes an inner boss portion.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus, comprising:
a first component comprising a metal;
a second component comprising a metal;
a first interface between the first component and the second component, wherein a metal mesh is interposed in the first interface;
a composite component comprising a composite material, the composite component having a first portion filling voids in the first interface and in the metal mesh, and a second portion forming a structure that adjoins the first component and the second component;
wherein the composite material is selected from the group consisting of metallics or inter-metallics; and
wherein the metal mesh extends into the second portion of the composite component.

2. The apparatus of claim 1, wherein the first component comprises an inner metallic flange ring and wherein the second component comprises an outer metallic flange ring.

3. The apparatus of claim 1, wherein the first interface includes a rolled lip.

4. The apparatus of claim 1, further comprising a second interface between the first component and the composite component, wherein the metal mesh is interposed in the second interface.

5. The apparatus of claim 4, wherein the second interface comprises an axial segment of the composite component.

6. The apparatus of claim 1, further comprising a second interface between the second component and the composite component, wherein the metal mesh is interposed in the second interface.

7. The apparatus of claim 6, wherein the second interface comprises an axial segment of the composite component.

8. The apparatus of claim 1, wherein the metal mesh comprises a member selected from the group consisting of: hardwire tape, hardwire fabric, metallic mat, a plurality of metal wires, and a metal screen.

9. The apparatus of claim 1, wherein the metal mesh extends into the second portion of the composite component at approximately a center of the composite component.

10. An apparatus, comprising:
an outer metallic component and an inner metallic component having a circumferential interface;
a composite component that adjoins the outer metallic component and the inner metallic component;
wherein the outer metallic component, inner metallic component and composite component form a gas turbine case; and
a metal mesh disposed in the circumferential interface and extending axially into the composite component.

11. The apparatus of claim 10, wherein the outer metallic component and the inner metallic component form a flange.

12. The apparatus of claim 10, wherein the composite component comprises a non-metallic composite.

13. The apparatus of claim 10, wherein the composite component extends into the circumferential interface and fills voids in the circumferential interface.

14. The apparatus of claim 10, wherein the composite component is circumferentially flush with the outer metallic component and the inner metallic component.

15. An apparatus, comprising:
an outer metallic component and an inner metallic component having a circumferential interface;
a composite component that adjoins the outer metallic component and the inner metallic component;
wherein the outer metallic component and the inner metallic component form a connection interface; and
a metal mesh for transferring a connecting force from the connection interface to the composite component, wherein the connection interface comprises one of a flange interface and a boss interface.

16. The apparatus of claim 15, wherein the metal mesh for transferring the connecting force includes a wire mesh sandwiched between the outer metallic component and the inner metallic component, wherein the wire mesh extends into the composite component.

17. The apparatus of claim 16, wherein the circumferential interface includes a rolled lip, and wherein the wire mesh sandwiched between the outer metallic component and the inner metallic component extends into the rolled lip.

18. An apparatus, comprising:
a first component comprising a metal;
a second component comprising a metal;
a first interface between the first component and the second component, wherein a metal mesh is interposed in the first interface;
a composite component comprising a composite material, the composite component having a first portion filling voids in the first interface and in the metal mesh, and a second portion forming a structure that adjoins the first component and the second component;
wherein the composite material is selected from the group consisting of non-metallics, ceramics, metallics, matrix composites, inter-metallics, fibers and/or resins;
wherein the metal mesh extends into the second portion of the composite component; and
wherein the first component comprises a metallic boss inner portion and wherein the second component comprises a metallic boss outer portion.

* * * * *